United States Patent [19]
Akiyama

[11] Patent Number: 5,894,466
[45] Date of Patent: *Apr. 13, 1999

[54] OPTICAL PICKUP DEVICE FOR ACCESSING EACH OF OPTICAL DISKS OF DIFFERENT TYPES

[75] Inventor: Hiroshi Akiyama, Yokohama, Japan

[73] Assignee: Ricoh Company, Ltd., Tokyo, Japan

[*] Notice: The term of this patent shall not extend beyond the expiration date of Pat. No. 5,717,678.

[21] Appl. No.: 08/946,592

[22] Filed: Oct. 7, 1997

Related U.S. Application Data

[63] Continuation of application No. 08/745,421, Nov. 12, 1996, Pat. No. 5,717,678.

[30] Foreign Application Priority Data

Nov. 16, 1995 [JP] Japan .................. 7-298398
Jan. 16, 1996 [JP] Japan .................. 8-004609

[51] Int. Cl.$^6$ .................................................. G11B 7/00
[52] U.S. Cl. ................................... 369/118; 369/112
[58] Field of Search .............................. 369/43, 44.14, 369/44.24, 53, 54, 58, 100, 103, 109, 110, 112, 118, 94

[56] References Cited

U.S. PATENT DOCUMENTS 5,621,717 4/1997 Finkelstein et al. .............. 369/112
5,717,678 2/1998 Akiyama ............................ 369/118

FOREIGN PATENT DOCUMENTS

| 0 470 807 A1 | 2/1992 | European Pat. Off. . |
| 0 610 055 A2 | 8/1994 | European Pat. Off. . |
| 0 737 964 A1 | 10/1996 | European Pat. Off. . |
| 8-241529 | 9/1996 | Japan . |
| WO 96/28816 | 9/1996 | WIPO . |

*Primary Examiner*—Paul W. Huber
*Attorney, Agent, or Firm*—Dickstein Shapiro Morin & Oshinsky LLP

[57] ABSTRACT

An optical pickup device includes a light source which emits a laser beam to an optical disk. An objective lens converts the emission beam into a converging beam, the converging beam passing through a transparent layer of the optical disk and forming a light spot on a recording surface of the optical disk. A photodetecting unit generates a read-data signal based on a reflection beam from the optical disk. A beam converting unit converts a reflection beam directed to the photodetecting unit such that the reflection beam is allowed to enter the photodetecting unit when a first optical disk is accessed, and a central portion of the reflection beam is allowed to enter the photodetecting unit and a peripheral portion of the reflection beam is inhibited from entering the photodetecting unit when a second optical disk is accessed.

17 Claims, 14 Drawing Sheets

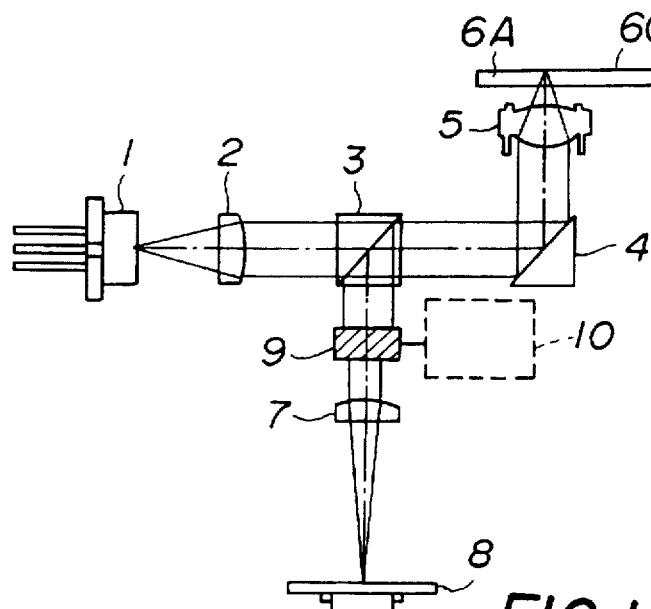
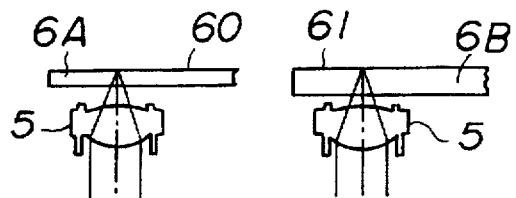
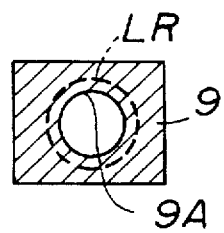
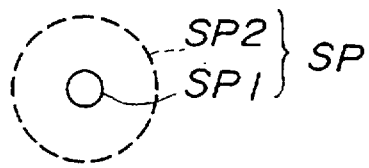
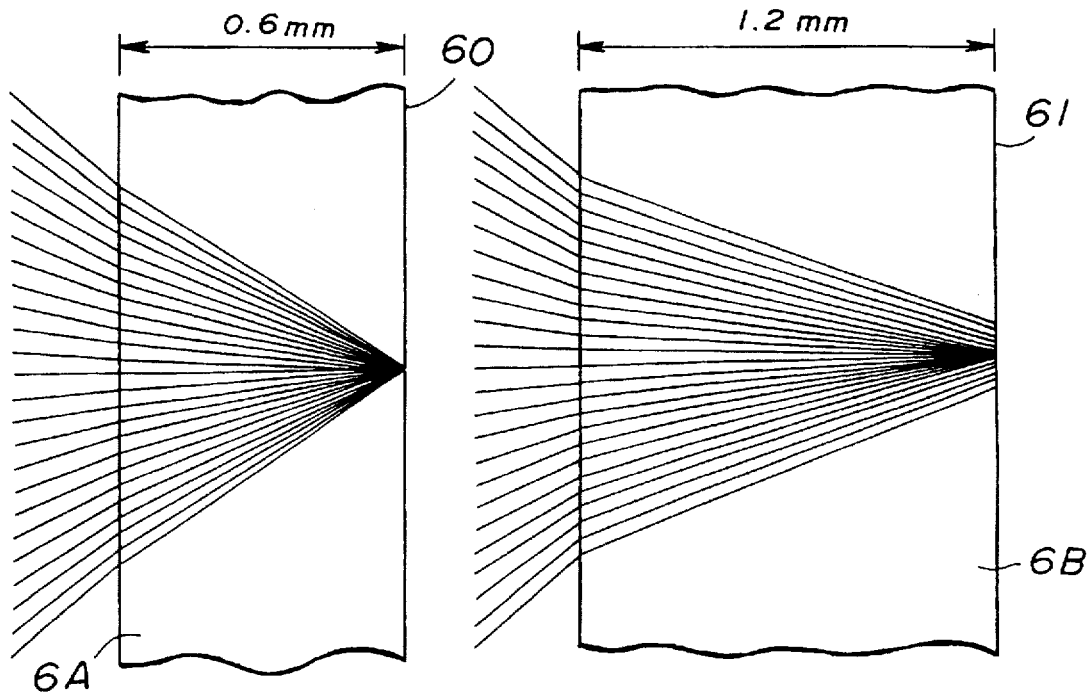

OPTICAL PICKUP DEVICE FOR ACCESSING EACH OF OPTICAL DISKS OF DIFFERENT TYPES

This application is a continuation of application Ser. No. 08/745,421 filed Nov. 12, 1996, now U.S. Pat. No. 5,717,678.

BACKGROUND OF THE INVENTION

(1) Field of the Invention

The present invention relates to an optical pickup device which detects a reflection beam from an optical disk and generates a read-data signal based on the reflection beam.

(2) Description of the Related Art

A conventional optical pickup device for reading out data from an optical disk is known. In the conventional optical pickup device, a laser beam is emitted by a semiconductor laser to the optical disk. The emission beam from the semiconductor laser is converted into a converging beam by an objective lens, the converging beam passing through a transparent layer of the optical disk and forming a light spot on a recording surface of the optical disk. In the optical pickup device, a photodetecting unit generates a signal indicative of read-out data by detecting a reflection beam from the optical disk.

In recent years, optical disks such as compact disks (CD) are widely used to store information and reproduce the information. In the near future, two different types of the optical disks will come to be popular: a standard recording-density optical disk and a high recording-density optical disk. One of the basic requirements for these optical disks is that the standard recording-density type has a transparent layer which is about 1.2 mm thick, and the high recording-density type has a transparent layer which is about 0.6 mm thick.

It is desirable to provide an optical pickup device which can access the standard recording-density optical disk and the high recording-density optical disk in common by using the same pickup device, in order to enable data to be read out from each of the two optical disks.

Generally, in the optical pickup device, an emission beam from the semiconductor laser is converted into a converging beam by the objective lens, the converging beam passing through the transparent layer of the optical disk and forming a light spot on the recording surface of the optical disk. When the standard recording-density optical disk is accessed, the diameter of the light spot has to be about 1.5 µm. When the high recording-density optical disk is accessed, the diameter of the light spot has to be about 0.95 µm.

Since the diameter of the light spot on the recording surface of each of the two optical disks requires a high accuracy, it is necessary that optical characteristics (e.g., spherical aberration) of the objective lens be suitably preset depending on the thickness of the transparent layer of each of the two optical disks.

In order to provide an optical pickup device capable of suitably accessing both the two optical disks, it is conceivable that the optical characteristics of the objective lens are preset depending on the smaller thickness of the transparent layer of the high recording-density optical disk.

When the high recording-density optical disk is accessed by using the above objective lens, the converging beam from the objective lens can correctly pass through the transparent layer (the thickness: about 0.6 mm) of the optical disk and form a light spot which is suited to the requirement for the high recording-density type.

However, when the standard recording-density optical disk is accessed, the converging beam from the above objective lens cannot suitably pass through the transparent layer (the thickness: about 1.2 mm) of the optical disk and form a light spot which is suited to the standard recording-density optical disk. In particular, the converging beam from the above objective lens does not converge on the recording surface of the standard recording-density optical disk. Since the spherical aberration is poor due to the different thickness of the transparent layer of the optical disk, a suitably focused light on the recording surface of the optical disk is not formed.

In a conventional method for eliminating the problem of the above-mentioned optical pickup device, an aperture unit with an opening is placed on an optical path of the emission beam from the objective lens to the optical disk when the standard recording-density optical disk is accessed. The aperture unit has not to be placed when the high recording-density optical disk is accessed. When the standard recording-density optical disk is accessed, the aperture unit is placed on the optical path of the emission beam. This allows a desired portion of the converging beam from the objective lens to be directed to the optical disk, but inhibits an undesired portion of the converging beam from entering the optical disk, so as to avoid the above-described problem.

However, when an optical pickup device in which the above method is incorporated for practical use is taken into consideration, the position at which the aperture unit is placed on the optical path of the emission beam requires a very high accuracy. In order to meet this requirement, it is necessary that the above optical pickup device include an aperture moving mechanism which very accurately moves the aperture unit onto the optical path of the emission beam. When the above optical pickup device is produced, an additional process for producing the aperture moving mechanism must be performed. Further, the aperture moving mechanism and the aperture unit must require a very high accuracy of the assembly. Therefore, the above-described optical pickup device is not useful to reduce the cost of the optical pickup device or allow efficient production processes thereof.

SUMMARY OF THE INVENTION

An object of the present invention is to provide an improved optical pickup device in which the above-described problems are eliminated.

Another object of the present invention is to provide an optical pickup device which can effectively access each of first and second optical disks having transparent layers with different thicknesses in order to provide a capability for the optical pickup device to generate a read-data signal from each of the two optical disks of different types by using the same device.

Still another object of the present invention is to provide an optical pickup device which can effectively read out data from each of the two optical disks by using a simple structure which is useful to reduce the cost or allow an efficient manufacture of the optical pickup device.

The above-mentioned objects of the present invention are achieved by an optical pickup device for accessing each of a first optical disk having a transparent layer with a first thickness and a second optical disk having a transparent layer with a second, greater thickness, the optical pickup device comprising: a light source which emits a laser beam to an optical disk; an objective lens which converts the emission beam from the light source into a converging beam, the converging beam passing through a transparent layer of the optical disk and forming a light spot on a recording surface of the optical disk, the objective lens having optical characteristics which are preset depending on the first thickness of the first optical disk; a photodetecting unit which generates a read-data signal based on a reflection beam from the optical disk; and a beam converting unit which converts a reflection beam directed to the photodetecting unit such that the reflection beam is allowed to enter the photodetecting unit when the first optical disk is accessed, and a central portion of the reflection beam is allowed to enter the photodetecting unit and a peripheral portion of the reflection beam is inhibited from entering the photodetecting unit when the second optical disk is accessed.

It is possible for the optical pickup device of the present invention to effectively access each of first and second optical disks having transparent layers with different thicknesses without producing an undesired reduction of the amplitude of the signal generated by the photodetecting unit. Further, it is possible for the present invention to provide a capability for the optical pickup device to effectively generate a read-data signal from each of the two optical disks by using the same device.

BRIEF DESCRIPTION OF THE DRAWINGS

Other objects, features and advantages of the present invention will become more apparent from the following detailed description when read in conjunction with the accompanying drawings in which:

FIGS. 1A through 1F are diagrams showing an optical pickup device to which one embodiment of the present invention is applied;

DETAILED DESCRIPTION OF THE PREFERRED EMBODIMENTS

Figure 2A:
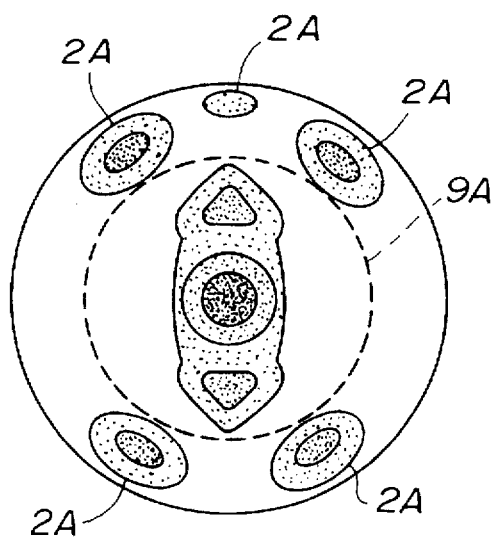
FIGS. 2A and 2B are diagrams showing cross-sectional distributions of intensity of a reflection beam when a standard-recording-density optical disk is accessed.

A description will now be given of the preferred embodiments of the present invention with reference to the accompanying drawings.

FIGS. 1A through 1F show an optical pickup device to which one embodiment of the present invention is applied.

Referring to FIG. 1A, an emission beam emitted by a laser diode (or a semiconductor laser) 1 is converted into a parallel beam by a collimator lens 2. The parallel beam passes through a beam splitter 3, and it is deflected by a deflection prism 4 to an optical disk. The deflected beam from the deflection prism 4 is converted into a converging beam by an objective lens 5. The converging beam from the objective lens 5 passes through a transparent layer of the optical disk, and a light spot on the recording surface of the optical disk is formed.

A reflection beam from the optical disk passes through the objective lens 5, and it is deflected by the deflection prism 4 to the beam splitter 3. The reflection beam from the deflection prism 4 is reflected by the beam splitter 3 to an aperture unit 9. The reflection beam passed through the aperture unit 9 is converted into a converging beam by a detecting lens 7. The converging beam from the detecting lens 7 enters a photodiode 8. The photodiode 8 generates a signal indicative of read-out data based on the reflection beam from the optical disk. As described above, the reflection beam passes through the aperture unit 9 between the beam splitter 3 and the detecting lens 7.

The optical disk shown in FIG. 1A is a high-recording-density optical disk 6A having a recording surface 60 and a first transparent layer. The first transparent layer is about 0.6 mm thick.

FIG. 1B shows a standard-recording-density optical disk 6B. The standard-recording-density optical disk 6B has a recording surface 61 and a second transparent layer. The second transparent layer is about 1.2 mm thick. The thickness of the second transparent layer of the optical disk 6B is greater than the thickness of the first transparent layer of the optical disk 6A.

FIG. 1C shows the aperture unit 9 of the optical pickup device in FIG. 1A. The aperture unit 9 in the present embodiment is a light-shading plate having a circular opening 9A. The light-shading plate is indicated by hatching lines in FIG. 1C.

In the optical pickup device of the present embodiment, when the optical disk 6B is accessed, the aperture unit 9 in FIG. 1C is placed on the optical path between the beam splitter 3 and the detecting lens 7. At this time, the aperture unit 9 is set in a light-shading condition in which a peripheral portion of the reflection beam from the beam splitter 3 is cut off by the light-shading plate of the aperture unit 9. A central portion of the reflection beam passes through the opening 9A of the aperture unit 9 to the photodiode 8.

On the other hand, when the optical disk 6A is accessed, the aperture unit 9 is set in a non-shading condition. At this time, both the central portion and the peripheral portion of the reflection beam are allowed to pass through the aperture unit 9 to the photodiode 8.

Accordingly, the aperture unit 9 converts the reflection beam directed to the photodiode 8 such that the central portion and the peripheral portion of the reflection beam are allowed to enter the photodiode 8 when the optical disk 6A is accessed, and the central portion is allowed to enter the photodiode 8 and the peripheral portion is inhibited from entering the photodiode 8 when the optical disk 6B is accessed.

In the optical pickup device of the present embodiment, a focus error detecting unit which outputs a focus error signal and/or a tracking error detecting unit which outputs a tracking error signal are provided. These detecting units output the error signals separately from a read-data signal generated by the photodiode 8 based on the reflection beam from the optical disk. However, in the present embodiment, the focus error detecting unit and the tracking error detecting unit are not shown in FIG. 1A and a description thereof will be omitted for the sake of convenience.

The high-recording-density optical disk 6A has, as shown in FIG. 1D, the recording surface 60 and the first transparent layer. In the optical disk 6A, the emission beam from the objective lens 5 passes through the first transparent layer to the recording surface 60, and the distance that the emission beam has to transmit for the optical disk 6A is the thickness of the first transparent layer which is about 0.6 mm.

The optical characteristics of the objective lens 5 in the present embodiment are set depending on the thickness of the first transparent layer of the optical disk 6A. Therefore, when the optical disk 6A is accessed, the emission beam is converted into a converting beam by the objective lens 5, and a light spot on the recording surface 60 of the optical disk 6A is correctly formed, as shown in FIG. 1D.

The standard-recording-density optical disk 6B has, as shown in FIG. 1E, the recording surface 61 and the second transparent layer. In the optical disk 6B, the emission beam from the objective lens 5 passes through the second transparent layer to the recording surface 61, and the distance that the emission beam has to transmit for the optical disk 6B is the thickness of the second transparent layer which is about 1.2 mm.

As shown in FIG. 1E, when the optical disk 6B is accessed, a central portion of the emission beam near the optical axis is converted into a converting beam by the objective lens 5, and it is converging on the recording surface 61 of the optical disk 6B. However, a peripheral portion of the emission beam from the objective lens 5 does not sufficiently converge on the recording surface 61 of the optical disk 6B.

FIG. 1F shows a light spot "SP" which is formed on the recording surface 61 of the optical disk 6B by the emission beam from the objective lens 5. As shown in FIG. 1F, a central area "SP1" of the light spot SP is produced by the central portion (the converging portion) of the emission beam from the objective lens 5. The intensity of the central area SP1 is relatively great. A peripheral area "SP2" of the light spot SP is produced by the peripheral portion (the non-converging portion) of the emission beam from the objective lens 5. In the light spot SP, the central area SP1 is surrounded by the peripheral area SP2. The intensity of the peripheral area SP2 is relatively small. When the optical disk 6B is accessed, the light spot SP on the recording surface 61 of the optical disk 6B becomes "imprecise" in the peripheral area SP2.

As shown in FIG. 1E, when the optical disk 6B is accessed, the peripheral portion of the emission beam from the objective lens 5 forms the non-converging portion of the light spot on the recording surface 61 of the optical disk 6B. Similarly to the emission beam, the reflection beam from the recording surface 61 of the optical disk 6B also includes a peripheral portion, and such a peripheral portion of the reflection beam passes through the objective lens 5 to the photodiode 8.

Figure 2B:
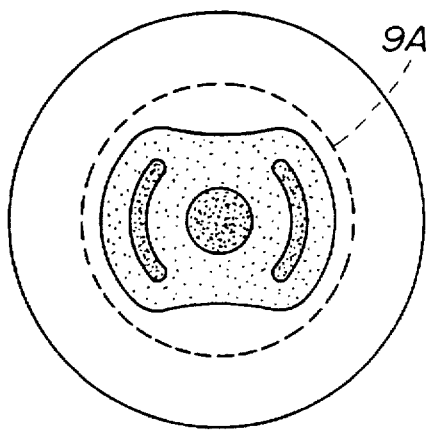

FIGS. 2A and 2B show cross-sectional distributions of intensity of the reflection beam when the standard-recording-density optical disk 6B is accessed by the optical pickup device. In FIGS. 2A and 2B, the intensity of the reflection beam for white areas (with no dot indicated) is very small, and the intensity of the reflection beam for dotted areas is varied in proportion with the density of dots indicated. The intensity of the reflection beam for areas in which the dot density in FIGS. 2A and 2B is small is relative small, and the intensity of the reflection beam for areas in which the dot density in FIGS. 2A and 2B is great is relatively great.

Figure 18:
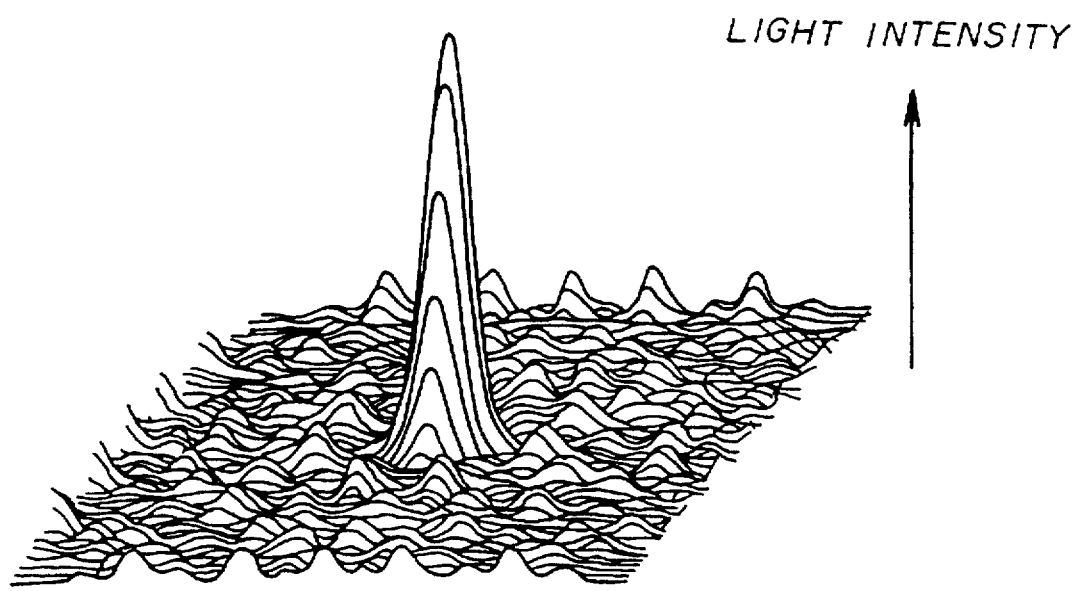
FIG. 18 is a diagram showing a distribution of light intensity of a recording surface when a light spot on the recording surface of the standard recording-density optical disk.

More specifically, the intensity of the reflection beam has the cross-sectional distribution, shown in FIG. 2A, when the light spot SP is located at an interval between pits on a track of the optical disk 6B. The intensity of the reflection beam has the cross-sectional distribution, shown in FIG. 2B, when the light spot SP is located at the center of a pit on the track of the optical disk 6B. Concerning a distribution of the light intensity of the recording surface of the optical disk 6B when the light spot is formed thereon, refer to FIG. 18.

As shown in FIG. 2A, when the light spot SP is located at the interval on the track of the optical disk 6B, there are several areas 2A with a relatively great intensity in the peripheral portion of the reflection beam. These areas 2A serve to produce noises in the read-data signal when it is generated by the photodiode 8.

When the position of the light spot SP on the track of the optical disk 6B is moved from the interval to the center of the pit, the cross-sectional distribution of the intensity of the reflection beam is changed from the condition in FIG. 2A to the condition in FIG. 2B. The position of the light spot SP is further moved to a next interval on the track of the optical disk 6B.

As shown in FIG. 2B, when the light spot SP is located at the center of the pit on the track of the optical disk 6B, there is no area 2A with the relatively great intensity in the reflection beam, and the intensity of the reflection beam for the central portion only is relatively great. Therefore, the difference in the intensity of the reflection beam between the condition in FIG. 2A and the condition in FIG. 2B is relatively small.

Figure 3:
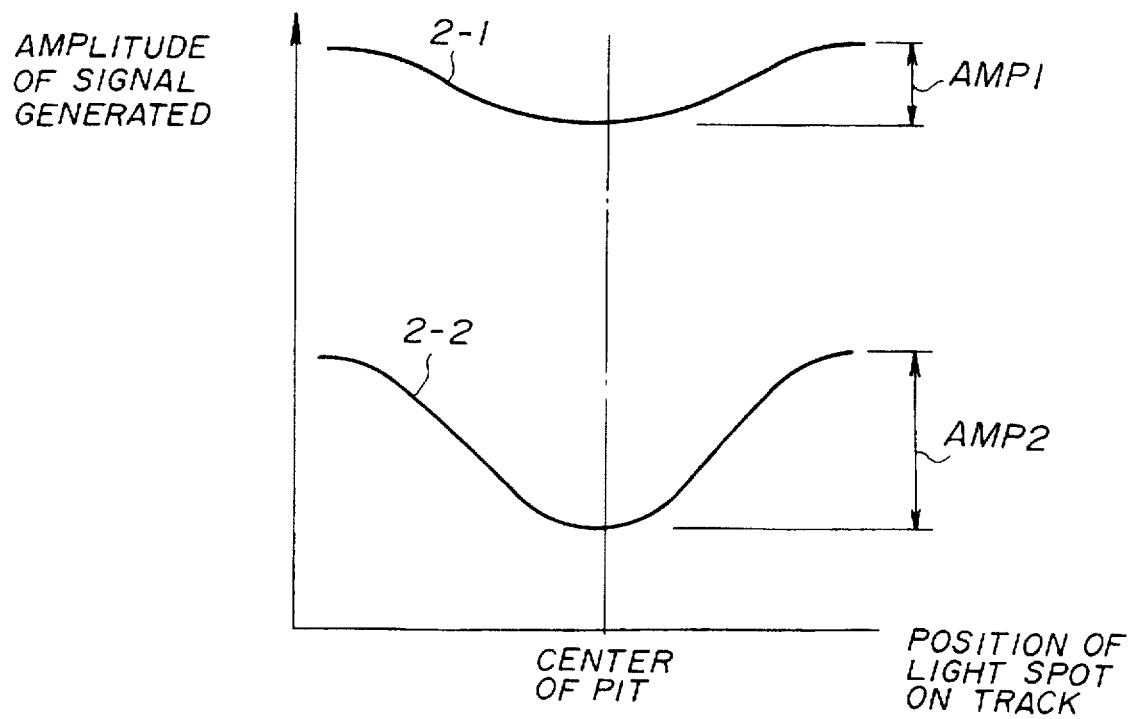
FIG. 3 is a diagram which is useful for explaining a change in the amplitude of a signal generated by a photodiode when a position of a light spot on a track of the optical disk is moved.

FIG. 3 shows a change in the amplitude of a signal generated by a photodetector when the position of the light spot SP on the track of the optical disk 6B is moved from the interval to the interval via the center of the pit.

When the position of the light spot SP on the track of the optical disk 6B is moved, the amplitude of the signal is changed as indicated by a curve "2-1" in FIG. 3. The amplitude of the signal is the smallest (or the lower peak) when the light spot SP is located at the center of the pit, and it is the greatest (or the upper peak) when the light spot SP is located at the interval. A difference "AMP1" between the upper peak and the lower peak on the curve "2-1" in FIG. 3 is relatively small.

Therefore, if the aperture unit 9 is not placed on the optical path when the optical disk 6B is accessed, it is difficult for the optical pickup device to effectively read out the pit on the track of the optical disk 6B since the difference AMP1 in the amplitude of the signal is relatively small.

In the present embodiment, since the aperture unit 9 is placed on the optical path when the optical disk 6B is accessed, the areas 2A in the peripheral portion of the reflection beam are eliminated by the aperture unit 9. Thus, when the position of the light spot SP on the track of the optical disk 6B is moved from the interval to the next interval via the center of the pit, the amplitude of the signal generated by the photodiode 8 is changed as indicated by a curve "2-2" in FIG. 3. The difference between the upper peak and the lower peak on the curve "2-2" can be increased to a relatively great difference "AMP2" as shown in FIG. 3.

The optical pickup device of the present invention utilizes the aperture unit 9 and it can effectively read out the data from the standard-recording-density optical disk 6B. However, when the high-recording-density optical disk 6A is accessed, the light spot on the recording surface of the optical disk 6A is correctly formed, but the amplitude of the signal generated by the photodiode 8 is reduced due to the aperture unit 9.

In order to eliminate the above-mentioned problem when the optical disk 6A is accessed, a waveform equalizer circuit may be added to the optical pickup device of the present embodiment. The amplitude of the signal generated by the photodiode 8 can be electrically corrected by the waveform equalizer circuit.

In the optical pickup device of the present embodiment, the aperture unit 9 is arranged at a fixed position relative to the optical pickup device.

In the optical pickup device of the present embodiment, a setting unit 10 connected to the aperture unit 9 is further included. In FIG. 1, the setting unit 10 is indicated by a dotted line, which shows that the setting unit 10 may or may not be used by the optical pickup device of the present embodiment. If the setting unit 10 is used, the setting unit 10 sets the aperture unit 9 in one of a first condition (the non-shading condition) in which the central portion and the peripheral portion of the reflection beam directed to the photodiode 8 are allowed to enter the photodiode 8 and a second condition (the light-shading condition) in which the peripheral portion is inhibited from entering the photodiode 8 and only the central portion is allowed to enter the photodiode 8.

When the optical disk 6A is accessed, the setting unit 10 sets the aperture unit 9 in the first condition, and the central portion and the peripheral portion are not shaded by the light-shading plate of the aperture unit 9 and they are allowed to pass through the opening 9A to the photodiode 8. When the optical disk 6B is accessed, the setting unit 10 sets the aperture unit 9 in the second condition, and the peripheral portion is shaded by the light-shading plate but the central portion is allowed to pass through the opening 9A to the photodiode 8.

Since the difference in the amplitude of the signal generated by the photodiode 8 for each of the optical disk 6B and the optical disk 6A can be maintained at the relatively great level "AMP2", the optical pickup device of the present embodiment can effectively read out the data from each of the optical disk 6B and the optical disk 6A.

According to the present invention, several variations of the aperture unit 9 and the setting unit 10 of the above-described embodiment may be made. Typical examples of the aperture unit 9 and the setting unit 10 for practical use will be described in the following.

As shown in FIG. 1C, the aperture unit 9 has the light-shading plate with the opening 9A. The setting unit 10 is a moving mechanism for moving the light-shading plate of the aperture unit 10. When the optical disk 6B is accessed, the light-shading plate is placed on an optical path of the reflection beam directed to the photodiode 8, thereby the light-shading place inhibiting the peripheral portion from entering the photodiode 8.

The moving mechanism mentioned above may be a solenoid-actuation type which is capable of shifting the light-shading plate by using an actuation force of a solenoid coil, or a motor-drive type which is capable of rotating or swinging the light-shading plate by using a driving force of a motor.

In the above-described embodiment, the positional relation between the opening of the aperture unit 9 and the reflection beam must be accurately set. However, the accuracy of the positional relation when the light-shading plate is placed on the optical path of the reflection beam directed to the photodiode 8 is lower than the accuracy of the positional relation when an aperture unit is placed on the optical path of the emission beam directed to the optical disk as in the conventional device. In the above-described embodiment, the accuracy of the positional relation can be reduced to a reasonable level.

Figures 4A, 4B:
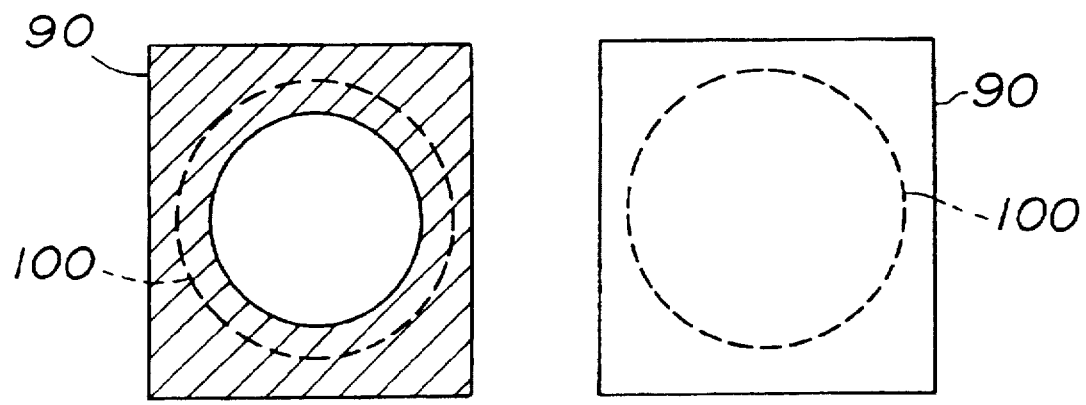
FIGS. 4A and 4B are diagrams which are useful for explaining a liquid-crystal shutter which is used as an aperture unit in another embodiment.

FIGS. 4A and 4B show a liquid-crystal shutter 90 which is used as another example of the aperture unit 9. In FIGS. 4A and 4B, reference numeral 100 indicates the reflection beam which is directed to the photodiode 8 by the beam splitter 3. A portion of the liquid-crystal shutter 90 which is set in an opaque condition is indicated by hatching lines in FIG. 4A. In FIG. 4B, the liquid-crystal shutter 90 which is set in a transparent condition is indicated.

As shown in FIGS. 4A and 4B, the liquid-crystal shutter 90 has an opening, and the liquid-crystal shutter 90 is electrically set in one of the transparent condition (FIG. 4B) and the opaque condition (FIG. 4A). When the optical disk 6A is accessed, the liquid-crystal shutter 90 is electrically set in the transparent condition, and the central portion and the peripheral portion of the reflection beam 100 are allowed to pass through the shutter 90 to the photodiode 8. When the second optical disk 6B is accessed, the liquid-crystal shutter 90 is set in the opaque condition, and the peripheral portion is inhibited by the shutter 90 from entering the photodiode 8 and only the central portion is allowed to pass through the opening to the photodiode 8.

In the embodiments in FIGS. 1C, 4A and 4B, each of the aperture unit 9 and the liquid-crystal shutter 90 has the opening shaped into a circle. However, the aperture unit 9 of the present invention is not limited to these embodiments. An aperture unit having a light-shading plate with an opening, the opening being shaped into an ellipse, may be suitably used by the optical pickup device of the present invention.

Figure 5:
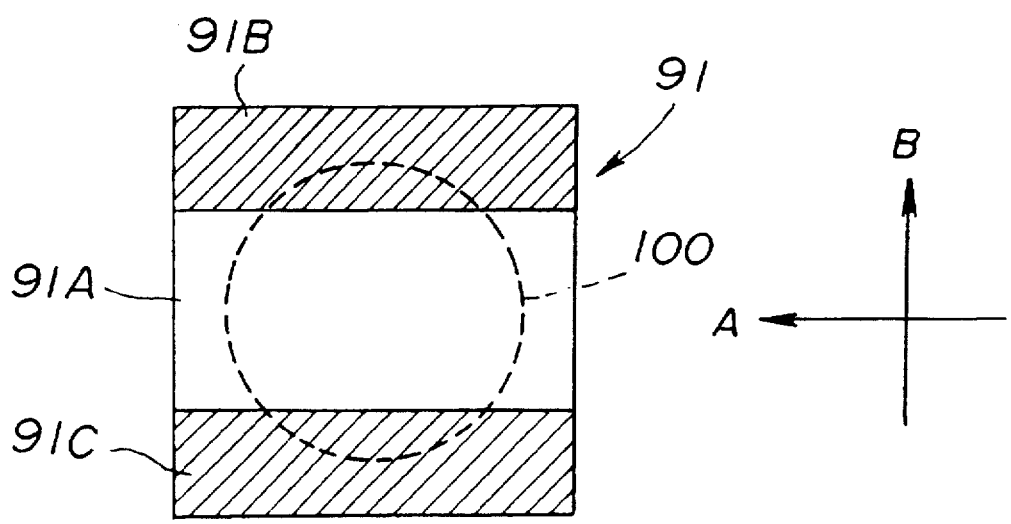
FIG. 5 is a diagram which is useful for explaining an aperture unit having a rectangular opening extending in a direction parallel to a track of the optical disk.

FIG. 5 shows an aperture unit 91 which is an alternative of the aperture unit 9 for use in the optical pickup device in FIG. 1A. In FIG. 5, a direction parallel to a track of the optical disk is indicated by an arrow "A", and a direction perpendicular to the direction of the track of the optical disk is indicated by an arrow "B".

As shown in FIG. 5, the aperture unit 91 has a rectangular opening 91A and a pair of upper and lower light-shading plates 91B and 91C on both sides of the opening 91A. The opening 91A extends in the direction "A" parallel to a track of the optical disk. The upper and lower light-shading plates 91B and 91C are arranged in the direction "B" perpendicular to the track of the optical disk.

In the above aperture unit 91, the light-shading plates 91B and 91C cut off the peripheral portion of the reflection beam directed to the photodiode 8 when each of the optical disks 6A and 6B is accessed. The above aperture unit 91 has an advantageous feature which will be described below with reference to FIGS. 6A, 6B and 6C.

Figure 6A:
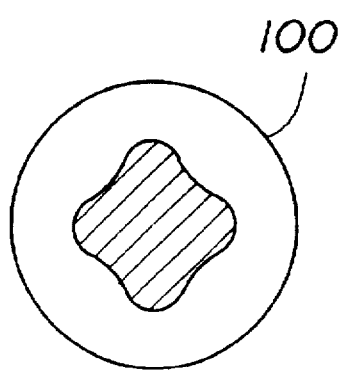
FIGS. 6A, 6B and 6C are diagrams which are useful for explaining an operation of the aperture unit in FIG. 5.

FIG. 6A shows the reflection beam 100 which is directed to the photodiode 8 when the optical disk 6A is accessed and the light spot of the corresponding emission beam is located at the center of a pit of the optical disk 6A. At this time, areas with a relatively great intensity considerably influencing the generation of a read-data signal by the photodiode 8, which are indicated by hatching lines in FIG. 6A, gather in the central portion of the reflection beam 100 only.

Figure 6B:
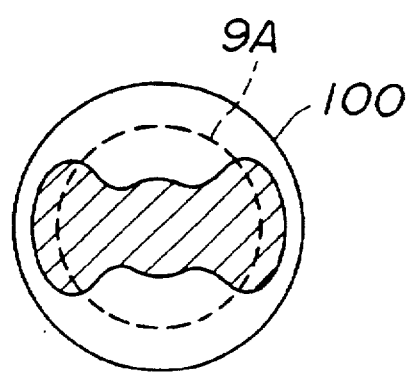

FIG. 6B shows the reflection beam 100 which is directed to the photodiode 8 when the optical disk 6A is accessed and the light spot is located at the interval between pits of the optical disk 6A. At this time, areas with a relatively great intensity considerably influencing the generation of a read-data signal by the photodiode 8, which are indicated hatching lines in FIG. 6B, extend over the central portion to the peripheral portion of the reflection beam 100. Since the recording density of the optical disk 6A is high and the interval between the pits is small, the diffraction angles of the 0th and 1st order diffraction rays of the reflection beam 100 become great.

If the peripheral portion of the reflection beam 100 is cut off by the aperture unit 9 having the circular opening 9A, as shown in FIG. 6B, the amplitude of the read-data signal generated by the photodiode 8 when the light spot is located at the interval of the optical disk 6A is considerably reduced. Therefore, in such a case, the generation of the read-data signal by the photodetector 8 when the optical disk 6A having the transparent layer with the smaller thickness is accessed is considerably influenced.

Figure 6C:
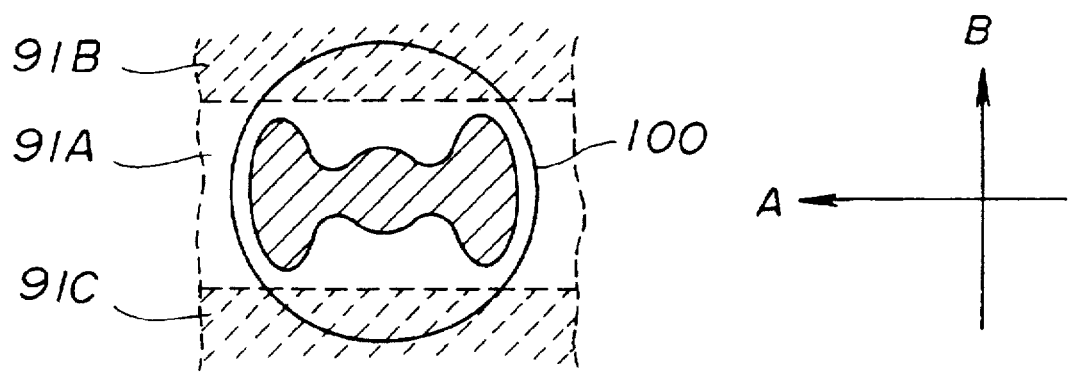

As shown in FIG. 6C, if the peripheral portion of the reflection beam 100 is cut off by the aperture unit 91 having the rectangular opening 91A and the light-shading plates 91B and 91C, the undesired reduction of the amplitude of the read-data signal generated by the photodiode 8 when the light spot is located at the interval of the optical disk 6A can be avoided. This is because the areas with a relatively great intensity in the reflection beam 100 are not shaded by the aperture unit 91 of the present embodiment.

Accordingly, in the optical pickup device including the aperture unit 91, it is possible to effectively read out data from the optical disk without producing the undesired reduction of the amplitude of the read-data signal generated by the photodetector 8 not only when the optical disk 6B is accessed but also when the optical disk 6A is accessed.

The size of the opening for each of the aperture unit 9, the liquid-crystal shutter 90, and the aperture unit 91 can be suitably predetermined by using experimental results such that the generation of the read-data signal by the photodiode 8 when the optical disk 6B is accessed becomes optimal. The size of the opening mentioned above is represented by any of the diameter of the circular opening for the aperture unit 9, the major-axis diameter and/or the minor-axis diameter of the elliptical opening for the aperture unit 9, and the width of the rectangular opening 91A of the aperture unit 91.

According to the present invention, the following method of determining the size of the opening for each of the aperture unit 9, the liquid-crystal shutter 90, and the aperture unit 91 is found the most suitable. That is, the size of the opening is predetermined such that the predetermined size is suited to form an appropriate light spot on the recording surface of the optical disk when the aperture unit is placed on an optical path of the emission beam directed to the optical disk.

More specifically, in the above-mentioned method, the optical characteristics of the objective lens 5 are preset depending on the transparent layer thickness (0.6 mm) of the optical disk 6A so that an appropriate light spot (the diameter: 0.9 μm) is formed on the recording surface of the optical disk 6A with the 0.6-mm thick transparent layer. With the above objective lens 5, the aperture unit is placed on the optical path of the emission beam directed to the optical disk, and the size of the opening of the aperture unit is predetermined to be a suitable size so that an appropriate light spot (the diameter: 1.5 μm) is formed on the recording surface of the optical disk 6B with the 1.2-mm thick transparent layer.

By using the optical pickup device including the above aperture unit with the opening of the predetermined size, it can be confirmed by experiment that it effectively read out data from each of the optical disks 6A and 6B without producing the undesired reduction of the amplitude of the read-data signal generated by the photodetector 8.

Further, in the optical pickup device of the present embodiment, when the optical disk 6B is accessed, the photodiode 8 detects the central portion (SP1 in FIG. 1F) of the reflection beam (SP) to generate a read-data signal based on the central portion only, and when the optical disk 6A is accessed, the photodiode 8 detects both the central portion (SP1) and the peripheral portion (SP2) of the reflection beam (SP) to generate a read-data signal based on the entire reflection beam (SP).

Accordingly, the optical pickup device of the present embodiment can effectively read out data from each of the optical disks 6A and 6B by using the same device without producing the undesired reduction of the amplitude of a read-data signal generated by the photodiode 8 not only when the optical disk 6A is accessed but also when the optical disk 6B is accessed.

Figure 7A:
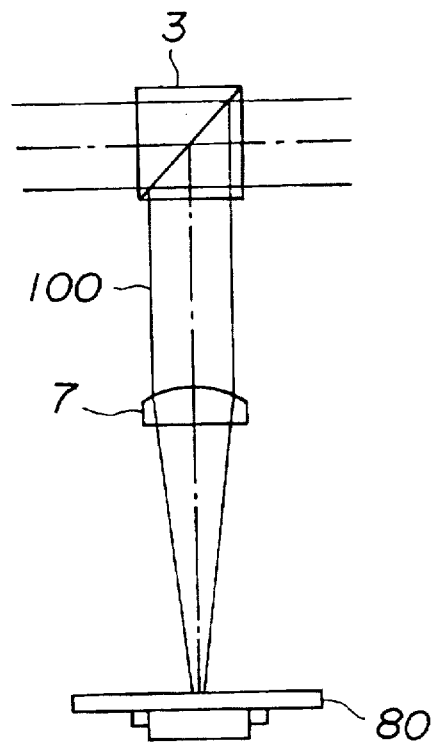
FIGS. 7A and 7B are diagrams showing a portion of an optical pickup device in another embodiment of the present invention.
Figure 7B:
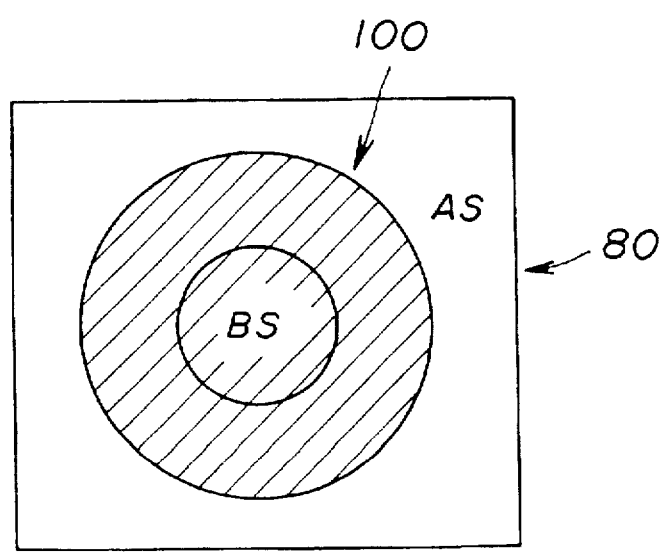

FIGS. 7A and 7B show a portion of an optical pickup device in another embodiment of the present invention. In FIGS. 7A and 7B, the elements which are the same as corresponding elements in FIG. 1A are designated by the same reference numerals, and a description thereof will be omitted.

Referring to FIG. 7A, the reflection beam 100 from the optical disk is reflected to the detecting lens 7 by the beam splitter 3. The reflection beam 100 is converted into the converging beam by the detecting lens 7, and the converging beam enters a photodetecting unit 80.

Referring to FIG. 7B, the photodetecting unit 80 includes a first detecting area "BS" which detects the central portion of the reflection beam 100, and a second detecting area "AS" which detects the peripheral portion of the reflection beam 100. As shown in FIG. 7B, the two detecting areas BS and AS are arranged around the center of the photodetecting unit 80, and the first detecting area BS is surrounded by the second detecting area AS.

In the present embodiment, when the optical disk 6B is accessed, a read-data signal SB is generated based on the central portion of the reflection beam 100 detected by the first detecting area BS. At this time, a read-data signal which is generated based on the peripheral portion of the reflection beam 100 detected by the second detecting area AS is eliminated. On the other hand, when the optical disk 6A is accessed, a sum of a read-data signal SB and a read-data signal SA is generated by the photodetecting unit 80 based on the entire reflection beam detected by the first detecting area BS and the second detecting area AS.

In order to make effective the generation of a read-data signal by the photodetecting unit 80 when the optical disk 6B is accessed, the positional relation between the photodetecting unit 80 and the detecting lens 7 on the optical axis of the detecting lens 7 is adjusted so that an appropriate light spot on the second detecting area BS is formed by the central portion of the reflection beam 100.

In the above-described embodiment, the aperture unit 9 (not shown in FIG. 7A) may or may not be placed on the optical path of the reflection beam directed to the photodetecting unit 80. If the aperture unit 9 is placed, it is possible for the optical pickup device of the present embodiment to more effectively read out data from each of the optical disks 6A and 6B.

Figure 8A:
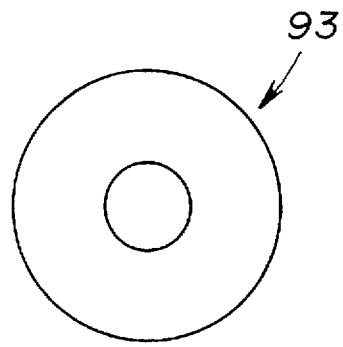
FIGS. 8A through 8E are diagrams showing a portion of an optical pickup device in still another embodiment of the present invention.
Figure 8B:
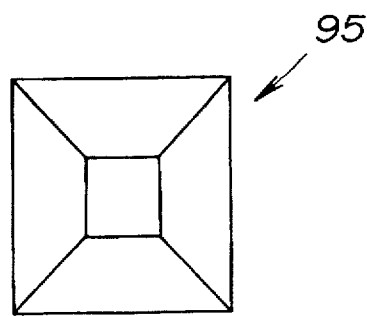

FIGS. 8A through 8E show a portion of an optical pickup device in still another embodiment of the present invention. In the present embodiment, the elements in FIGS. 8A and 8B are applied to the optical pickup device in FIG. 7A.

Figure 8C:
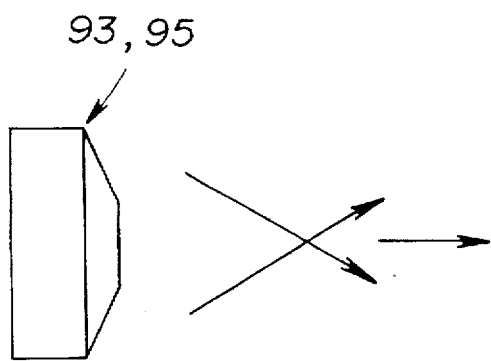
Figure 8D:
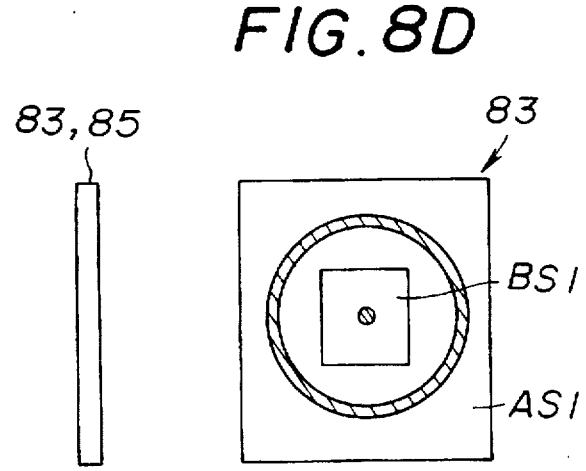
Figure 8E:
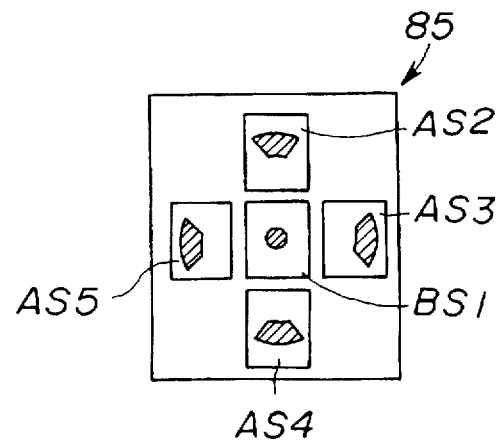

FIG. 8A shows an optical element 93 which is shaped into a truncated cone, and FIG. 8B shows an optical element 95 which is shaped into a truncated prism. One of the optical elements 93 and 95 is placed on the optical path between the detecting lens 7 and the photodetecting unit 80 in FIG. 7A. FIG. 8D shows a photodetecting unit 83 which is arranged in combination with the optical element 93 instead of the photodetecting unit 80, and FIG. 8E shows a photodetecting unit 85 which is arranged in combination with the optical element 95 instead of the photodetecting unit 80. FIG. 8C is a side view of the optical element 93 (or 95) and the photodetecting unit 83 (or 85) which are arranged in the optical pickup device.

Each of the optical elements 93 and 95 separates the reflection beam, directed to the photodetecting unit 83 or 85, into the central portion and the peripheral portion by using refraction, the central portion passing straight and the peripheral portion being refracted to different directions.

The photodetector unit 83 includes, as shown in FIG. 8D, a first detecting area "BS1" which detects the central portion of the reflection beam, and a second detecting area "AS1" which detects the peripheral portion of the reflection beam. The two detecting areas BS1 and AS1 are arranged around the center of the photodetecting unit 83, and the first detecting area BS1 is surrounded by the second detecting area AS1.

In the optical pickup device including the optical element 93 and the photodetecting unit 83, when the optical disk 6B is accessed, a read-data signal SB1 is generated based on the central portion detected by the first detecting area BS1. At this time, a read-data signal which is generated based on the peripheral portion detected by the second detecting area AS1 is eliminated. On the other hand, when the optical disk 6A is accessed, a sum of a read-data signal SB1 and a read-data signal SA1 is generated by the photodetecting unit 80 based on the entire reflection beam detected by the first detecting area BS1 and the second detecting area AS1.

Also, the photodetector unit 85 includes, as shown in FIG. 8E, a first rectangular detecting area "BS1" which detects the central portion of the reflection beam, and a plurality of second rectangular detecting areas "AS2", "AS3", "AS4" and "AS5" which detect the peripheral portion of the reflection beam. These areas BS1 and AS2–AS5 are arranged around the center of the photodetecting unit 85, and the area BS1 is surrounded by the areas AS2–AS5.

In the optical pickup device including the optical element 95 and the photodetecting unit 85, when the optical disk 6B is accessed, a read-data signal SB1 is generated based on the central portion detected by the detecting area BS1. When the optical disk 6A is accessed, a sum of a read-data signal SB1 and read-data signals SA2–SA5 is generated by the photodetecting unit 85 based on the entire reflection beam detected by the detecting area BS1 and the detecting areas AS2–AS5.

Figure 9A:
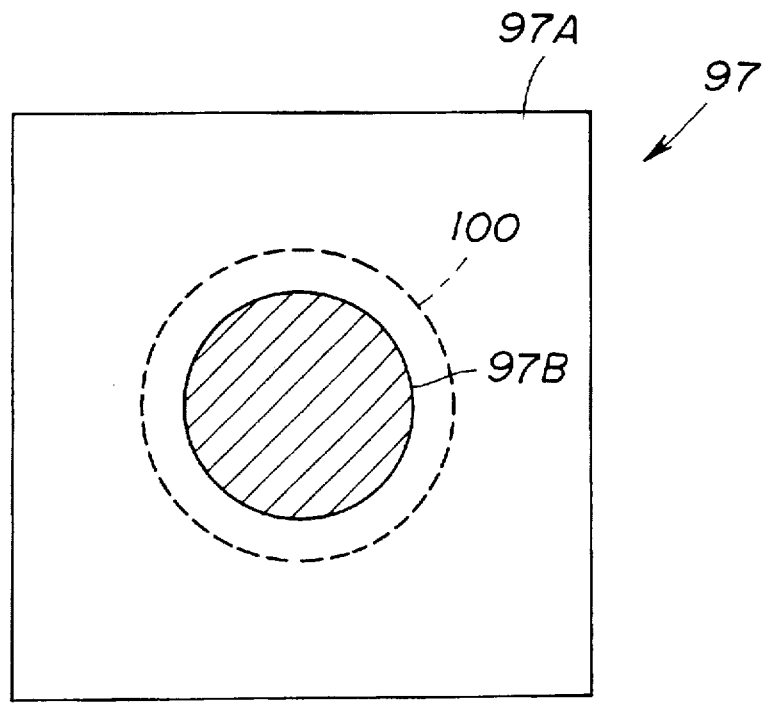
FIGS. 9A, 9B and 9C are diagrams showing a portion of an optical pickup device in a further embodiment of the present invention.
Figure 9B:
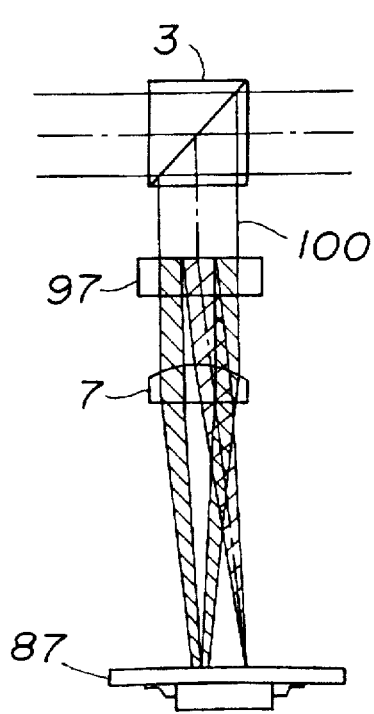
Figure 9C:
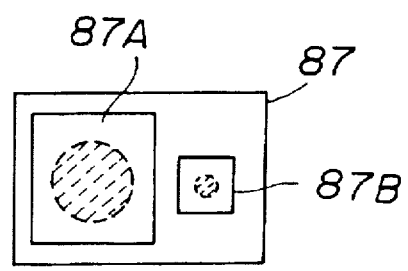

FIGS. 9A, 9B and 9C show a portion of an optical pickup device in a further embodiment of the present invention. In FIGS. 9A, 9B and 9C, the elements which are the same as corresponding elements in FIG. 1A are designated by the same reference numerals, and a description thereof will be omitted.

The optical pickup device of the present embodiment uses a diffraction unit 97 in FIG. 9A instead of the aperture unit 9 in FIG. 1A. The diffraction unit 97 separates the reflection beam 100, directed to the photodetecting unit, into the central portion and the peripheral portion by using diffraction.

The diffraction unit 97 includes a transparent area 97A and a diffraction grating 97B, the diffraction grating 97B surrounded by the transparent area 97A. The peripheral portion of the reflection beam 100 passes through the transparent area 97A of the diffraction unit 97 to the photodetector unit. The center portion of the reflection beam 100 is converted into a diffraction beam by the diffraction grating 97B, the diffraction beam passing in a predetermined direction different from the direction of the peripheral portion.

A preferred example of the diffraction grating 97B is a hologram diffraction grating or a blaze-type diffraction grating having a nearly 100% diffraction efficiency.

Further, the optical pickup device of the present embodiment uses a photodetecting unit 87 in FIG. 9C instead of the photodiode 8 in FIG. 1A. The reflection beam 100 from the optical disk is reflected to the diffraction unit 97 by the beam splitter 3. The reflection beam 100 is separated into the central portion and the peripheral portion by the diffraction unit 97 by using diffraction, as described above.

The peripheral portion of the reflection beam from the diffraction unit 97 is converted into the converging beam by the detecting lens 7, and the converging beam enters the photodetecting unit 87 at a first position. The diffraction beam (the central portion of the reflection beam) from the diffraction unit 97 is also converted into the converging beam by the detecting lens 7, and the converging beam passing in the predetermined direction enters the photodetecting unit 87 at a second position different from the first position of the above peripheral portion.

As shown in FIG. 9C, the photodetecting unit 87 has a first detecting area 87A which detects the peripheral portion of the reflection beam, and a second detecting area 87B which detects the central portion of the reflection beam. The two detecting areas 87A and 87B of the photodetecting unit 87 are arranged such that they are separate from each other.

Similarly to the previously-described embodiments, in the present embodiment, when the optical disk 6B is accessed, a read-data signal is generated by the photodetecting unit 87 based on the central portion of the reflection beam detected by the second detecting area 87B. At this time, a read-data signal generated based on the peripheral portion of the reflection beam detected by the first detecting area 87A is eliminated. On the other hand, when the optical disk 6A is accessed, a sum of a first read-data signal and a second read-data signal is generated by the photodetecting unit 87 based on the entire reflection beam detected by the first and second detecting areas 87A and 87B.

Figure 10A:
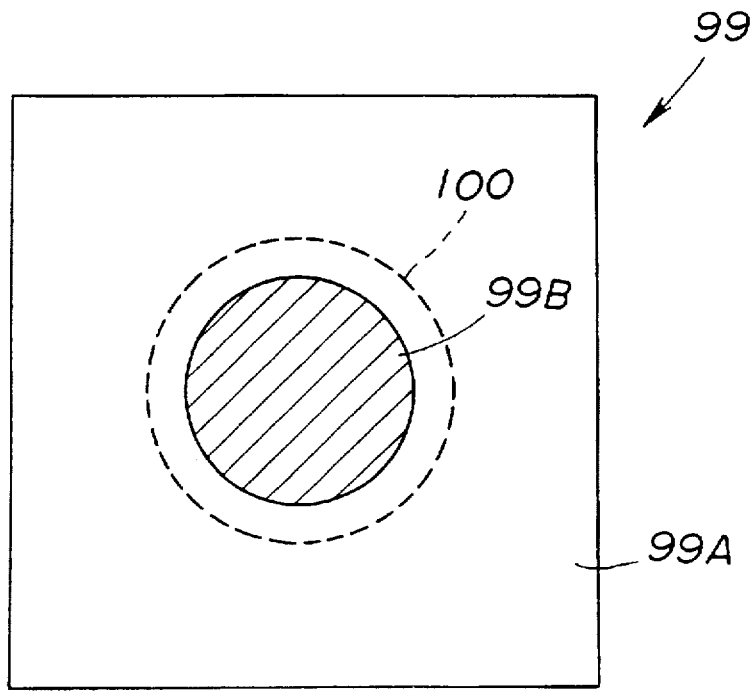
FIGS. 10A and 10B are diagrams showing a portion of an optical pickup device in another embodiment of the present invention.
Figure 10B:
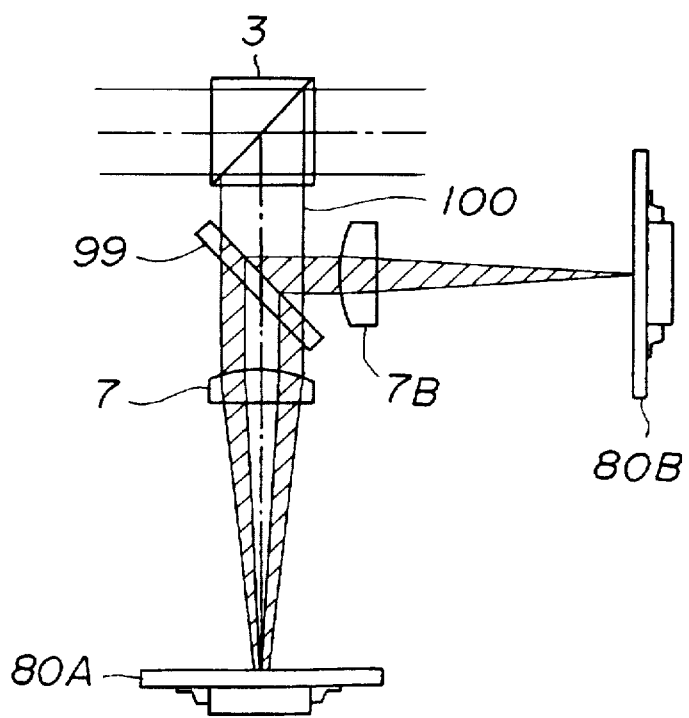

FIGS. 10A and 10B show a portion of an optical pickup device in another embodiment of the present invention. In FIGS. 10A, 10B and 10C, the elements which are the same as corresponding elements in FIG. 1A are designated by the same reference numerals, and a description thereof will be omitted.

In the present embodiment, a reflection unit 99 in FIG. 10A is used in the optical pickup device instead of the aperture unit 9 in FIG. 1A. The reflection unit 99 separates the reflection beam 100, directed to the photodetecting unit, into the central portion and the peripheral portion by using reflection.

The reflection unit 99 includes a transparent area 99A and a reflection mirror 99B, the reflection mirror 99B surrounded by the transparent area 99A. The peripheral portion of the reflection beam 100 passes through the transparent area 99A of the reflection unit 99 to a photodetecting unit. The center portion of the reflection beam 100 is reflected to another photodetecting unit by the reflection mirror 99B, the reflected beam passing in a predetermined direction different from the direction of the peripheral portion.

As shown in FIG. 10B, the reflection unit 99 is placed in a 45° slanting condition on the optical path of the reflection beam from the beam splitter 3 and the detecting lens 7. A first photodiode 80A and a second photodiode 80B are used in the optical pickup device of the present embodiment instead of the photodiode 8 in FIG. 1A. Further, a second detecting lens 7B is placed on an optical path of the reflected beam from the reflection unit 99 to the second photodiode 80B, in addition to the detecting lens 7. The reflection beam 100 from the optical disk is reflected to the reflection unit 99 by the beam splitter 3. As described above, the reflection beam 100 is separated into the central portion and the peripheral portion by the reflection unit 99 by using diffraction.

The peripheral portion of the reflection beam from the transparent area 99A of the reflection unit 99 is converted into a converging beam by the detecting lens 7, and the converging beam enters the first photodiode 80A. Similarly, the reflected beam (the central portion of the reflection beam) from the reflection mirror 99B is converted into a converging beam by the second detecting lens 7B, and the converging beam enters the second photodiode 80B.

In the present embodiment, when the optical disk 6B is accessed, the converging beam (the central portion of the reflection beam) from the second detecting lens 7B is detected by the second photodiode 80B, and a read-data signal is generated by the second photodiode 80B based on the central portion of the reflection beam. At this time, the generation of a read-data signal based on the peripheral portion of the reflection beam by the second photodiode 80B is inhibited. On the other hand, when the optical disk 6A is accessed, the converging beam (the peripheral portion of the reflection beam) from the detecting lens 7 is detected by the first photodiode 80A, and a sum of a first read-data signal and a second read-data signal is generated by the first photodiode 80A and the second photodiode 80B based on the entire reflection beam.

In the above-described embodiments in FIGS. 1A, 7A, 9B and 10B, the detecting lens 7 and the second detecting lens 7B are used to convert the reflection beam into a converting beam so that the converting beam correctly enters the photodetecting unit. When the size of the photodetecting unit is small, the detecting lens 7 and/or the second detecting lens 7B must be included in order to correctly detect the reflection beam from the optical disk. However, when a photodetecting unit having an adequately great size to detect the entire reflection beam is used, it is possible to omit the detecting lens 7 and/or the second detecting lens 7B from the optical pickup device.

Figure 11A:
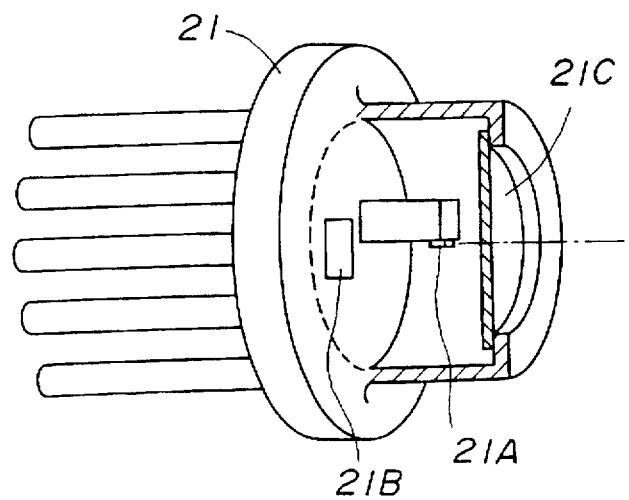
FIGS. 11A and 11B are diagrams showing an optical pickup device to which a further embodiment of the present invention is applied.
Figure 11B:
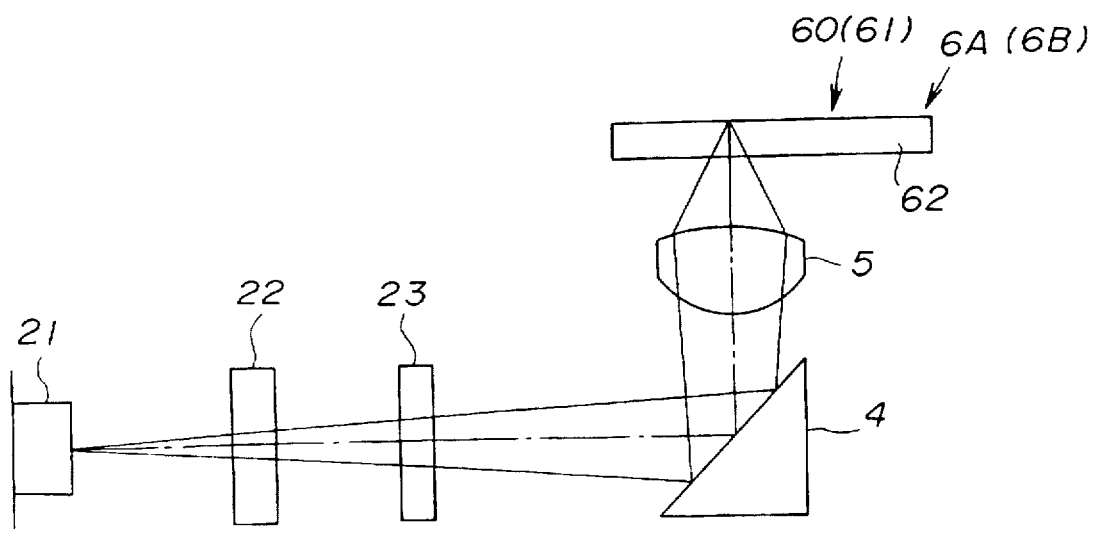

Next, FIGS. 11A and 11B show an optical pickup device to which a further embodiment of the present invention is applied. In FIGS. 11A and 11B, the elements which are the same as corresponding elements in FIG. 1A are designated by the same reference numerals, and a description thereof will be omitted.

Referring to FIG. 11A, a light emission/detection unit 21 includes a laser diode 21A and a photodiode 21B. The laser diode 21A emits an emission beam which is directed to an optical disk. The photodiode 21B detects a reflection beam which is reflected off from the optical disk, and generates a read-data signal based on the reflection beam. In this embodiment, the laser diode 21A and the photodiode 21B are packaged in a single unit.

As shown in FIG. 11A, the light emission/detection unit 21 has a window portion to which a cover glass 21C is attached. The emission beam and the reflection beam pass through the cover glass 21C.

Referring to FIG. 11B, the emission beam (which is a linearly polarized light) from the light emission/detection unit 21 passes through a polarization hologram 22 to a quarter-wave plate 23. The emission beam is converted into a circularly polarized light by the quarter-wave plate 23. The circularly polarized light from the quarter-wave plate 23 is deflected to the objective lens 5 by the deflection prism 4. The deflected beam from the deflection prism 4 is converted into a converging beam by the objective lens 5. The converging beam from the objective lens 5 passes through the transparent layer 62 of the optical disk 6A (or 6B), and a light spot on the recording surface 60 (or 61) of the optical disk is formed.

Similarly to the previous embodiment in FIG. 1A, the optical characteristics of the objective lens 5 in FIG. 11B are preset based on the thickness (0.6 mm) of the transparent layer 62 of the optical disk 6A. Therefore, when the optical disk 6A is accessed, the light spot on the recording surface 60 of the optical disk 6A is correctly formed.

A reflection beam from the optical disk passes through the objective lens 5, and it is deflected by the deflection prism 4 to the quarter-wave plate 23. The reflection beam (which is a circularly polarized light) from the deflection prism 4 is converted into a linearly polarized light by the quarter-wave plate 23. The linearly polarized light from the quarter-wave plate 23 enters the polarization hologram 22.

The linearly polarized light from the quarter-wave plate 23 is deflected to the photodiode 21B of the light emission/ detection unit 21 by the polarization hologram 22. The polarized light of the reflection beam when entering the polarization hologram 22 has a plane of polarization shifted 90° from a plane of polarization of the linearly polarized light of the emission beam from the laser diode 21A. Therefore, the polarized light is deflected to the photodiode 21B by the polarization hologram 22.

Figure 12:
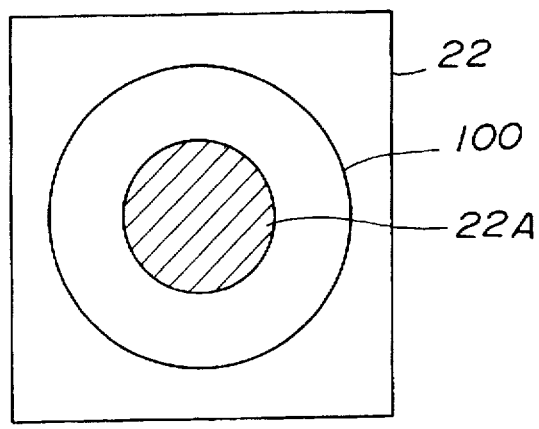
FIG. 12 is a diagram showing a polarization hologram of the optical pickup device in FIG. 11B.

FIG. 12 shows the polarization hologram 22 of the optical pickup device in FIGS. 11A and 11B.

Referring to FIG. 12, the polarization hologram 22 has a hologram area 22A which deflects the central portion of the reflection beam 100 to the photodiode 21B by using polarization. Thus, the central portion of the reflection beam 100 from the hologram area 22A enters the photodiode 21B. The peripheral portion of the reflection beam 100 passes through a peripheral area of the polarization hologram 22, other than the hologram area 22A, without deflection. Thus, the peripheral portion of the reflection beam 100 from the peripheral area of the polarization hologram 22 does not enter the photodiode 21B.

As described above, the optical characteristics of the objective lens 5 are preset based on the thickness (0.6 mm) of the transparent layer 62 of the optical disk 6A, and the light spot on the recording surface 60 of the optical disk 6A is correctly formed. Therefore, when the disk 6A is accessed, the polarization hologram 22 converts the reflection beam 100 directed to the photodiode 21B such that the reflection beam 100 is allowed to enter the photodiode 21B by using the above polarization. On the other hand, when the optical disk 6B is accessed, the polarization hologram 22 converts the reflection beam directed to the photodiode 21B such that the central portion of the reflection beam 100 is allowed to enter the photodiode 8 by using the above polarization, and the peripheral portion of the reflection beam 100 is inhibited from entering the photodiode 8.

In the embodiment in FIG. 1A, the detection of a focus error signal and a tracking error signal is performed separately from the read-data signal generated by the photodiode 8 based on the reflection beam from the optical disk. In the following embodiment, by using a polarization hologram 220 and a photodetecting unit 210B, it is possible to generate a focus error signal and a tracking error signal as well as a read-data signal based on the reflection beam from the optical disk with no need for the focus error detecting unit or the tracking error detecting unit. Next, a description of this embodiment will be given below.

Figure 13A:
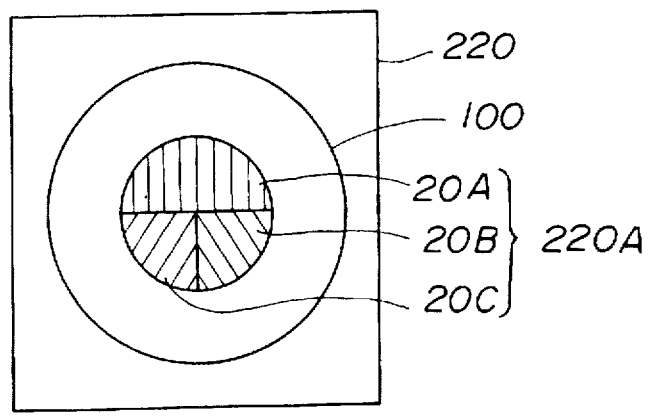
FIGS. 13A and 13B are diagrams showing another polarization hologram and another photodetecting unit for use in the optical pickup device in FIG. 11B.
Figure 13B:
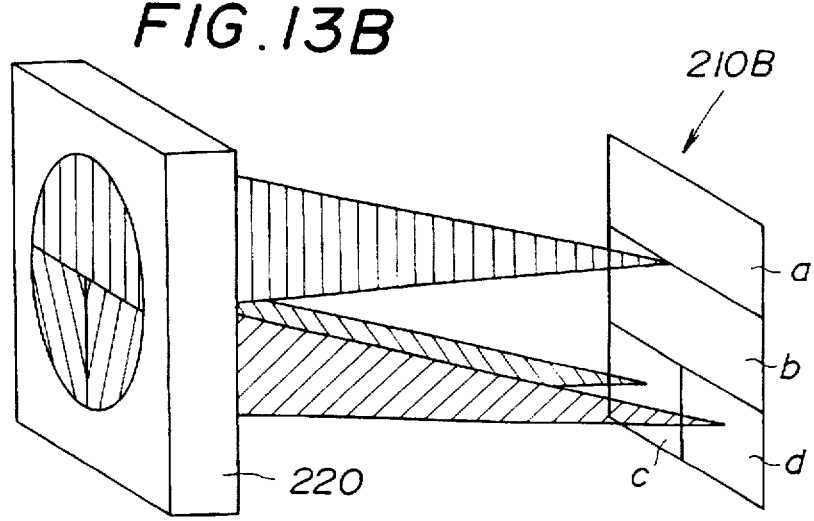

FIGS. 13A and 13B show another polarization hologram 220 and another photodetecting unit 210B for use in the optical pickup device in FIG. 11B.

Referring to FIGS. 13A and 13B, the polarization hologram 220 has a hologram area 220A which deflects the central portion of the reflection beam 100 to the photodiode 21B. The hologram area 220A is divided into three holograms 20A, 20B and 20C, the hologram 20A located at an upper half portion of the hologram area 220A, and the holograms 20B and 20C located at lower quarter portions of the hologram area 220A. Also, the photodetecting unit 210B is divided into four light detecting areas "a" through "d", the light detecting areas located as shown in FIG. 13B.

As shown in FIG. 13B, in the present embodiment, an upper half of the central portion of the reflection beam from the optical disk is deflected by the hologram 20A of the polarization hologram 220 to the photodetecting unit 210B, and the deflected reflection beam from the hologram 20A enters around the boundary between the light detecting areas "a" and "b" of the photodetecting unit 210B. Lower quarters of the central portion of the reflection beam 100 from the optical disk are deflected by the holograms 20B and 20C to the photodetecting unit 210B, and the deflected reflection beams from the holograms 20B and 20C enter the light detecting areas "c" and "d" of the photodetecting unit 210B, respectively.

Since the light detecting areas "a" and "b" output a first signal Sa and a second signal Sb based on the central portion of the reflection beam from the optical disk, a focus error signal can be obtained by generating the difference "Sa−Sb" between the first and second signals Sa and Sb by utilizing a known knife-edge method. Since the light detecting areas "c" and "d" output a third signal Sc and a fourth signal Sd based on the reflection beam from the optical disk, a tracking error signal can be obtained by generating the difference "Sc−Sd" between the third and fourth signals Sc and Sd by utilizing a known push-pull method. Further, in the present embodiment, a read-data signal can be obtained by generating the sum "Sa+Sb+Sc+Sd" of the signals Sa, Sb, Sc and Sd for each of the optical disks 6A and 6B.

In the present embodiment, when the optical disk 6B with the greater transparent layer thickness (1.2 mm) is accessed, the generation of the read-data signal based on the reflection beam is suitably performed by using the polarization hologram 220 and the photodetecting unit 210B. However, when the optical disk 6A with the smaller transparent layer thickness (0.6 mm) is accessed, the amplitude of the read-data signal generated by the photodetecting unit 210B is reduced due to the use of the polarization hologram 220.

In order to eliminate the above-mentioned problem when the optical disk 6A is accessed, a waveform equalizer circuit may be added to the optical pickup device of the present embodiment. The amplitude of the signal output by the photodetecting unit 210B can be electrically corrected by the waveform equalizer circuit.

Figure 14:
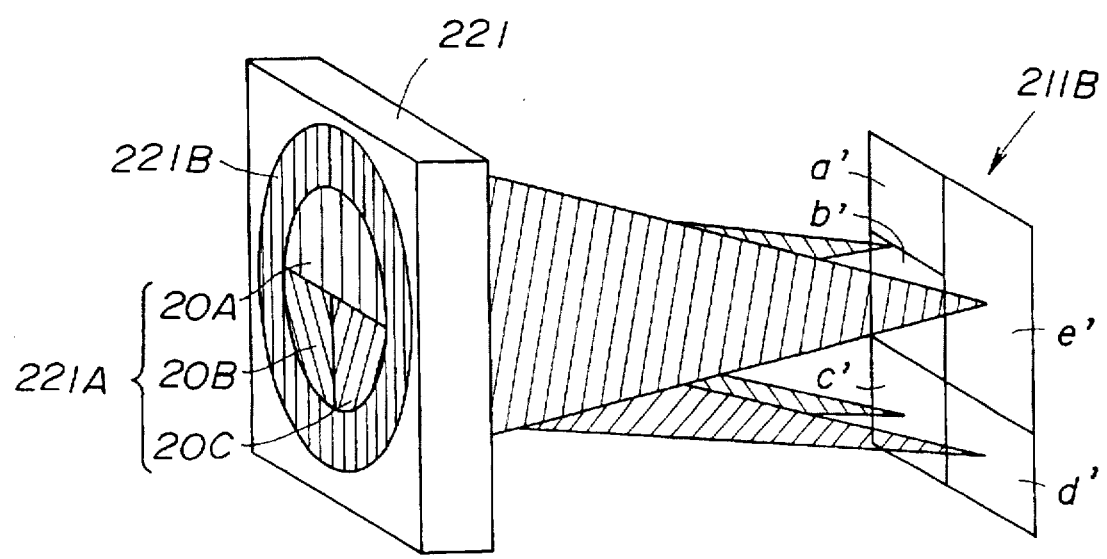
FIG. 14 is a diagram showing a further polarization hologram and a further photodetecting unit for use in the optical pickup device in FIG. 11B.

FIG. 14 shows a further polarization hologram 221 and a further photodetecting unit 211B for use in the optical pickup device in FIG. 11B. In the present embodiment, the elements of the optical pickup device which are the same as corresponding elements in FIG. 11B are not shown in FIG. 14 and a description thereof will be omitted for the sake of convenience.

In the present embodiment, it is also possible to eliminate the above-mentioned problem when the optical disk 6A is accessed by using the polarization hologram 221 and the photodetecting unit 211B.

Referring to FIG. 14, the polarization hologram 221 has a hologram area 221A which deflects the central portion of the reflection beam 100 to the photodetecting unit 211B, and a hologram area 221B which deflects the peripheral portion of the reflection beam to the photodetecting unit 211B. The hologram area 221A is divided into three holograms 20A, 20B and 20C similarly to the embodiment in FIGS. 13A and 13B. The photodetecting unit 211B is divided into five light detecting areas "a'" through "e'".

As shown in FIG. 14, in the present embodiment, an upper half of the central portion of the reflection beam from the optical disk is deflected by the hologram 20A to the photodetecting unit 211B, and the deflected reflection beam from the hologram 20A enters around the boundary between the light detecting areas "a'" and "b'" of the photodetecting unit 211B. Lower quarters of the central portion of the reflection beam from the optical disk are deflected by the holograms 20B and 20C to the photodetecting unit 210B, and the deflected reflection beams from the holograms 20B and 20C enter the light detecting areas "c'" and "d'" of the photodetecting unit 211B, respectively. Further, the peripheral portion of the reflection beam from the optical disk is deflected by the hologram area 221B to the photodetecting unit 211B, and the deflected reflection beam enters the light detecting area "e'" of the photodetecting unit 211B.

Since the light detecting areas "a'" and "b'" output a first signal Sa and a second signal Sb based on the reflection beam from the optical disk, a focus error signal can be obtained by generating the difference "Sa–Sb" between the signals Sa and Sb by utilizing the known knife-edge method. Since the light detecting areas "c'" and "d'" output a third signal Sc and a fourth signal Sd based on the reflection beam from the optical disk, a tracking error signal can be obtained by generating the difference "Sc–Sd" between the signals Sc and Sd by utilizing the known push-pull method. The light detecting area "e'" outputs a fifth signal Se based on the periperal portion of the reflection beam from the optical disk. Further, in the present embodiment, when the optical disk 6B is accessed, a read-data signal can be obtained by generating the sum "Sa+Sb+Sc+Sd" of the signals Sa, Sb, Sc and Sd, and when the optical disk 6A is accessed, a read-data signal can be obtained by generating the sum "Sa+Sb+Sc+Sd+Se" of the signals Sa, Sb, Sc, Sd and Se.

In the present embodiment, when each of the optical disks 6A and 6B is accessed, the generation of the read-data signal based on the reflection beam is suitably performed by using the polarization hologram 221 and the photodetecting unit 211B.

Figure 15:
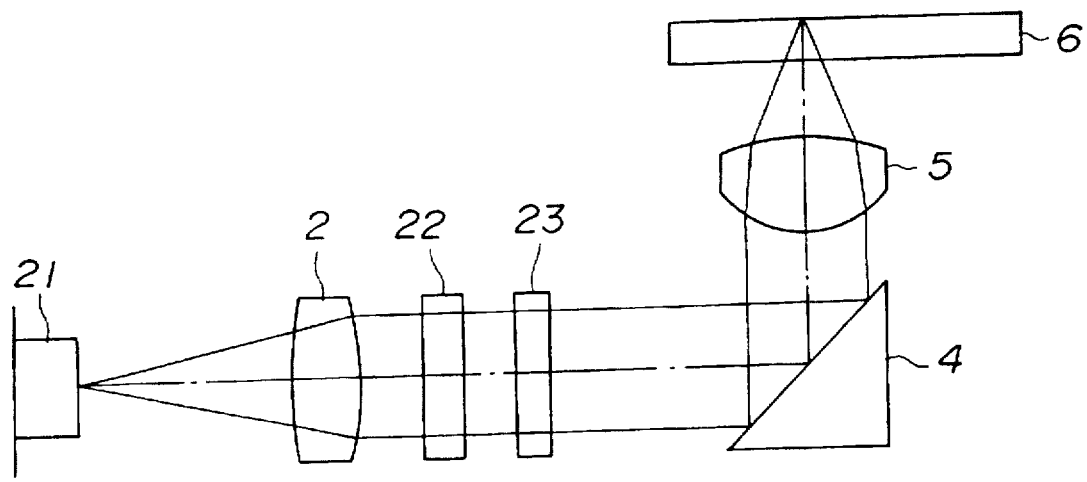
FIGS. 15 and 16 are diagrams which are useful for explaining variations of the optical pickup device in FIG. 11B.

Next, FIG. 15 shows a variation of the optical pickup device in FIG. 11B. In FIG. 15, the elements which are the same as corresponding elements in FIG. 11B are designated by the same reference numerals, and a description thereof will be omitted.

Referring to FIG. 15, the collimator lens 2 is provided on an optical path of the emission beam from the light source (the laser diode 21A) to the objective lens 5. The collimator lens 2 converts the emission beam from the light source 21A into a parallel beam, the parallel beam passing through the polarization hologram 22 to the quarter-wave plate 23.

In the present embodiment, the polarization hologram 22 is placed between the collimator lens 2 and the objective lens 5. Also, the quarter-wave plate 23 is placed between the polarization hologram 22 and the objective lens 5.

In the case of the optical pickup device in FIG. 11B, no collimator lens is provided on the optical path of the emission beam. If a distance between the laser diode 21A and the photodiode 21B in the direction B perpendicular to the optical path is about 1 mm and a distance between the polarization hologram 22 and the laser diode 21A in the direction A parallel to the optical path is about 5 mm, a deflection angle required for the polarization hologram 22 to make the polarized light of the center portion of the reflection beam correctly converge on the photodiode 21B is about 11.5 degrees. The deflection angle in this case is relatively great, and it is difficult that the size of the optical pickup device be reduced.

In the case of the optical pickup device in FIG. 15, the collimator lens 2 is provided, and this allows the size of the optical pickup device of the present embodiment to be reduced. If a focal length of the collimator lens 2 is about 16 mm, the distance between the laser diode 21A and the photodiode 21B in the direction B is about 1 mm and the distance between the polarization hologram 22 and the laser diode 21A in the direction A is about 5 mm, the deflection angle required for the polarization hologram 22 to make the polarized light of the center portion of the reflection beam correctly converge on the photodiode 21B is about 3.6 degrees which is rather smaller than the deflection angle of the embodiment in FIG. 11B. Therefore, it is possible for the present embodiment to considerably reduce the size of the optical pickup device.

Figure 16:
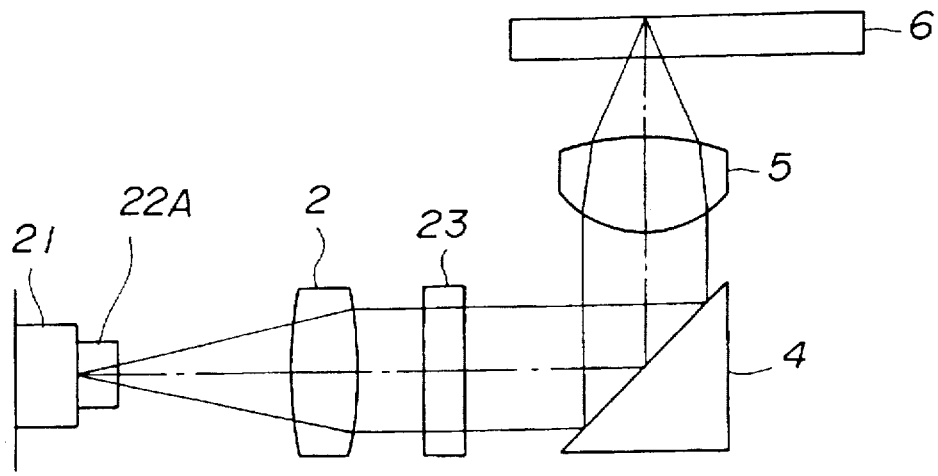

FIG. 16 shows another variation of the optical pickup device in FIG. 11B. In FIG. 16, the elements which are the same as corresponding elements in FIG. 11B are designated by the same reference numerals, and a description thereof will be omitted.

Referring to FIG. 16, a polarization hologram 22A is attached to the window portion of the light emission/detection unit 21 by using adhesive agent so that the laser diode 21A, the photodiode 21B, and the polarization hologram 22A are integrally formed with the light emission/detection unit 21. Further, the collimator lens 2 is provided on the optical path of the emission beam from the laser diode 21A to the objective lens 5. The collimator lens 2 converts the emission beam from the light source 21A into a parallel beam, the parallel beam entering the quarter-wave plate 23.

Since the laser diode 21A, the photodiode 21B, and the polarization hologram 22A are integrally formed with the light emission/detection unit 21, it is possible for the present embodiment to further reduce the size of the optical pickup device.

Figure 17:
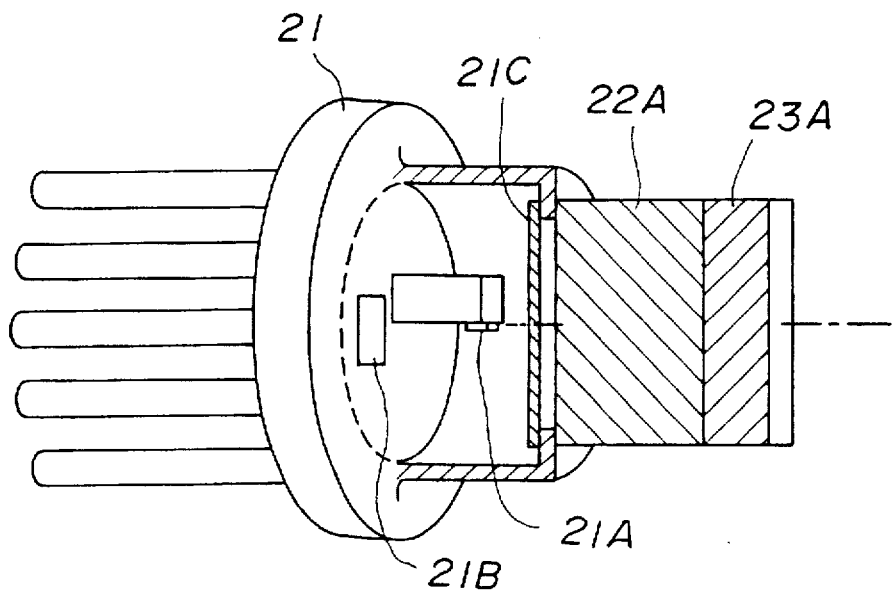
FIG. 17 is a diagram showing a further light emission/detection unit for use in the optical pickup device in FIG. 11B.

FIG. 17 shows a further light emission/detection unit 21 for use in the optical pickup device in FIG. 11B. In FIG. 17, the elements which are the same as corresponding elements in FIG. 11A are designated by the same reference numerals, and a description thereof will be omitted.

Referring to FIG. 17, the light emission/detection unit 21 includes the laser diode 21A, the photodiode 21B, the polarization hologram 22A, and a quarter-wave plate 23A which are arranged within a single unit. The polarization hologram 22A is attached to the window portion of the light emission/detection unit 21 by using adhesive agent. Further, the quarter-wave plate 23A is attached to the polarization hologram 22A by using adhesive agent.

Since the light source 21A, the photodetecting unit 21B, the polarization hologram 22A, and the quarter-wave plate 23A are integrally formed in the light emission/detection unit 21, the size of the optical pickup device can be reduced and the structure thereof can be simplified. Therefore, the optical pickup device of the present embodiment uses a simple structure which is useful to reduce the cost or allow an efficient manufacture of the optical pickup device.

Further, in the above embodiments in FIG. 12 (or FIG. 13A, FIG. 14), the polarization hologram 22 (or 220, 221) includes the hologram 22A (or 220A, 221A) which is shaped into a circle, the circle having a center on the optical path of the reflection beam. However, the hologram 22A (or 220A, 221A) of the present invention is not limited to these embodiments. A polarization hologram having a hologram shaped into an ellipse, the ellipse having a center on the optical path of the reflection beam, may be suitably used by the optical pickup device of the present invention.

Figure 19:
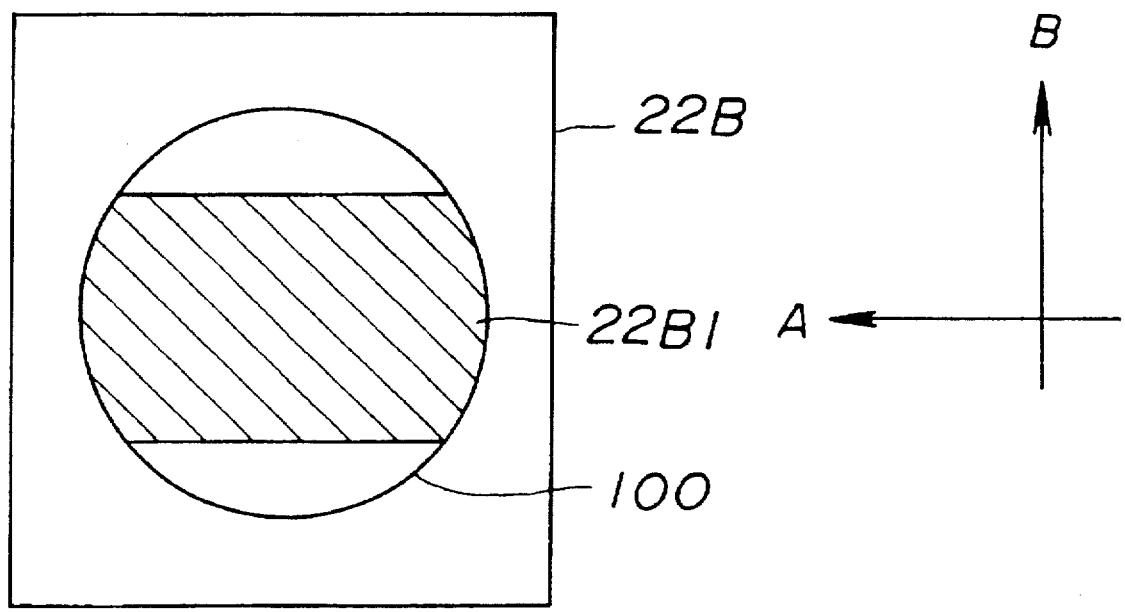
FIG. 19 is a diagram showing a further polarization hologram for use in the optical pickup device in FIG. 11B.

FIG. 19 shows a further polarization hologram 22B for use in the optical pickup device in FIG. 11B. In FIG. 19, the direction parallel to a track of the optical disk is indicated by an arrow "A", and the direction perpendicular to the direction of the track of the optical disk is indicated by an arrow "B".

As shown in FIG. 19, the polarization hologram 22B has a rectangular hologram 22B1 which detects the central portion of the reflection beam 100 from the quarter-wave plate 23. The rectangular hologram 22B1 extends in the direction "A" parallel to a track of the optical disk. In the present embodiment, the polarization hologram 22B in FIG. 19 is used instead in the optical pickup device in FIG. 11B.

In the present embodiment, the rectangular hologram 22B1 deflects the center portion of the reflection beam to the photodetecting unit 21B when each of the optical disks 6A and 6B is accessed. The rectangular hologram 22B1 has an advantageous feature which is the same as that of the aperture unit 91 shown in FIG. 5. For details of the advantageous feature of the aperture unit 91, see the above description thereof with reference to FIGS. 6A, 6B and 6C.

Further, the present invention is not limited to the above-described embodiment, and variations and modifications may be made without departing from the scope of the present invention.

What is claimed is:

1. An optical pickup device for accessing each of a first optical disk having a transparent layer with a first thickness and a second optical disk having a transparent layer with a second, greater thickness, comprising:

a light source for emitting a laser beam to an optical disk to be accessed; and detecting means for generating a read-data signal based on an entire reflection beam from the optical disk when the first optical disk is accessed, and for generating a read-data signal based on only a central portion of a reflection beam from the optical disk when the second optical disk is accessed.

2. The optical pickup device according to claim 1, further comprising:

an objective lens for converting the emission beam from the light source into a converging beam, said converging beam passing through a transparent layer of the optical disk and forming a light spot on a recording surface of the optical disk, said objective lens having optical characteristics which are preset depending on the first thickness of the first optical disk.

3. An optical pickup device for accessing each of a first optical disk having a transparent layer with a first thickness and a second optical disk having a transparent layer with a second, greater thickness, comprising:

a light source for emitting a laser beam to an optical disk to be accessed; and photodetecting means for generating a read-data signal based on a reflection beam from the optical disk, said photodetecting means having a first area which detects a central portion of the reflection beam from the optical disk and a second area which detects a peripheral portion of the reflection beam from the optical disk, wherein, when the first optical disk is accessed, said photodetecting means generates a read-data signal based on the entire reflection beam detected by said first area and said second area, and when the second optical disk is accessed, said photodetecting means generates a read-data signal based on only the central portion of the reflection beam detected by said first area.

4. An optical pickup device for accessing each of a first optical disk having a transparent layer with a first thickness and a second optical disk having a transparent layer with a second, greater thickness, comprising:

a light source for emitting a laser beam to an optical disk to be accessed;

a photodetector for generating a read-data signal based on a reflection beam from the optical disk;

an objective lens for converting the emission beam from the light source into a converging beam, said converging beam passing through a transparent layer of the optical disk and forming a light spot on a recording surface of the optical disk, said objective lens having optical characteristics which are preset depending on the first thickness of the first optical disk; and an aperture unit provided on an optical path of the reflection beam directed to the photodetector for inhibiting a peripheral portion of the reflection beam from entering the photodetector and for allowing a central portion of the reflection beam to enter the photodetector.

5. The optical pickup device according to claim 4, further comprising:

setting means for setting said aperture unit in one of a first condition in which the central portion and the peripheral portion are allowed to enter the photodetector and a second condition in which the peripheral portion is inhibited from entering the photodetector and the central portion is allowed to enter the photodetector, wherein the setting means sets the aperture unit in the first condition when the first optical disk is accessed, and the setting means sets the aperture unit in the second condition when the second optical disk is accessed.

6. The optical pickup device according to claim 4, wherein said aperture unit comprises an opening, said opening being rectangular and extending in a direction parallel to a track of the optical disk.

7. The optical pickup device according to claim 4, wherein said aperture unit comprises an opening, said opening having a predetermined size which is suited to form an appropriate light spot on a recording surface of the optical disk when the second optical disk is accessed and the aperture unit is placed on an optical path of the emission beam directed to the second optical disk.

8. An optical pickup device for accessing each of a first optical disk having a transparent layer with a first thickness and a second optical disk having a transparent layer with a second, greater thickness, comprising:

a light source for emitting a laser beam to an optical disk to be accessed;

a photodetector for generating a read-data signal based on a reflection beam from the optical disk;

an aperture unit provided on an optical path of the reflection beam directed to the photodetector for inhibiting a peripheral portion of the reflection beam from entering the photodetector and for allowing a central portion of the reflection beam to enter the photodetector; and setting means for setting said aperture unit in one of a first condition in which the central portion and the peripheral portion are allowed to enter the photodetector and a second condition in which the peripheral portion is inhibited from entering the photodetector and the central portion is allowed to enter the photodetector, wherein the setting means sets the aperture unit in the first condition when the first optical disk is accessed, and the setting means sets the aperture unit in the second condition when the second optical disk is accessed.

9. The optical pickup device according to claim 8, wherein said aperture unit comprises a light-shading plate having an opening, said light-shading plate being placed on the optical path of the reflection beam directed to the photodetector when the second optical disk is accessed, so that the light-shading plate inhibits the peripheral portion from entering the photodetector and the opening allows the central portion to enter the photodetector.

10. The optical pickup device according to claim 9, wherein said opening of said light-shading plate is shaped into one of a circle and an ellipse.

11. The optical pickup device according to claim 9, wherein said opening of said light-shading plate is rectangular and extends in a direction parallel to a track of the optical disk.

12. The optical pickup device according to claim 9, wherein said aperture unit comprises an opening, said opening having a predetermined size which is suited to form an appropriate light spot on a recording surface of the optical disk when the second optical disk is accessed and the aperture unit is placed on an optical path of the emission beam directed to the second optical disk.

13. The optical pickup device according to claim 8, wherein said aperture unit comprises a liquid-crystal shutter having an opening, said liquid-crystal shutter being electrically set by the setting means in one of a first condition in which the central portion and the peripheral portion are allowed to pass through said shutter to the photodetector and a second condition in which the peripheral portion is inhibited by said shutter from entering the photodetector and only the central portion is allowed to pass through said opening to the photodetector.

14. The optical pickup device according to claim 8, wherein said aperture unit comprises an opening, said opening being shaped into one of a circle and an ellipse.

15. The optical pickup device according to claim 8, wherein said aperture unit comprises an opening, said opening being rectangular and extending in a direction parallel to a track of the optical disk.

16. The optical pickup device according to claim 8, wherein said aperture unit comprises an opening, said opening having a predetermined size which is suited to form an appropriate light spot on a recording surface of the optical disk when the second optical disk is accessed and the aperture unit is placed on an optical path of the emission beam directed to the second optical disk.

17. An optical pickup device for accessing each of a first optical disk having a transparent layer with a first thickness and a second optical disk having a transparent layer with a second, greater thickness, comprising:

a light source for emitting a laser beam to an optical disk to be accessed;

photodetecting means for generating a read-data signal based on a reflection beam from the optical disk;

beam separating means for separating a reflection beam directed to said photodetecting means into a central portion and a peripheral portion; and means for allowing both the central portion and the peripheral portion of the reflection beam to enter said photodetecting means when the first optical disk is accessed, and for allowing the central portion of the reflection beam to enter said photodetecting means and inhibiting the peripheral portion of the reflection beam from entering said photodetecting means when the second optical disk is accessed.

* * * * *